(12) United States Patent
Shapiro et al.

(10) Patent No.: US 11,922,143 B1
(45) Date of Patent: Mar. 5, 2024

(54) SYSTEMS AND METHODS FOR PROVIDING A USER INTERFACE THAT FACILITATES APPLICATION DEVELOPMENT

(71) Applicants: Dmitry Shapiro, Spring Valley, CA (US); Sean Edward Thielen, New York, NY (US)

(72) Inventors: Dmitry Shapiro, Spring Valley, CA (US); Sean Edward Thielen, New York, NY (US)

( * ) Notice: Subject to any disclaimer, the term of this patent is extended or adjusted under 35 U.S.C. 154(b) by 0 days.

(21) Appl. No.: 18/482,008

(22) Filed: Oct. 5, 2023

(51) Int. Cl.
*G06F 8/30* (2018.01)
*G06F 8/34* (2018.01)
*G06F 8/35* (2018.01)

(52) U.S. Cl.
CPC . *G06F 8/34* (2013.01); *G06F 8/35* (2013.01)

(58) Field of Classification Search
CPC .............. G06F 8/34; G06F 8/35; G06N 20/00
See application file for complete search history.

(56) References Cited

U.S. PATENT DOCUMENTS

| | | | |
|---|---|---|---|
| 10,978,090 | B2 | 4/2021 | Binder |
| 11,681,505 | B2 * | 6/2023 | Mukherjee ............... G06F 8/36 717/107 |
| 2020/0184065 | A1 * | 6/2020 | Toth ....................... G06N 20/00 |
| 2023/0094646 | A1 | 3/2023 | Sanjay |
| 2023/0245651 | A1 | 8/2023 | Wang |
| 2023/0252224 | A1 | 8/2023 | Tran |
| 2023/0252233 | A1 | 8/2023 | Gutierrez |
| 2023/0259705 | A1 | 8/2023 | Tunstall-Pedoe |
| 2023/0273958 | A1 | 8/2023 | Laliberte |
| 2023/0273959 | A1 | 8/2023 | Laliberte |
| 2023/0274086 | A1 | 8/2023 | Tunstall-Pedoe |
| 2023/0274089 | A1 | 8/2023 | Tunstall-Pedoe |
| 2023/0274094 | A1 | 8/2023 | Tunstall-Pedoe |
| 2023/0281249 | A1 | 9/2023 | Laliberte |
| 2023/0316006 | A1 | 10/2023 | Tunstall-Pedoe |
| 2023/0325590 | A1 | 10/2023 | Shevchenko |
| 2023/0341950 | A1 | 10/2023 | Taylor |

(Continued)

OTHER PUBLICATIONS

Anonymous, User Interface and Application Programming Interface for Explaining Personalized Machine-Learned Model Outputs, Jan. 3, 2018, IP.com, pp. 1-34. Retrieved from the Internet: <URL https://priorart.ip.com/IPCOM/000252271:>. (Year: 2018).*

(Continued)

*Primary Examiner* — Hanh Thi-Minh Bui
(74) *Attorney, Agent, or Firm* — ESPLIN & ASSOCIATES, PC

(57) ABSTRACT

Systems and methods for providing a user interface that facilitates application development. The applications may utilize one or more underlying machine-learning models to perform application functions. Exemplary implementations may: effectuate presentation of an application development interface to developers through client computing platforms associated with the developers; receive, from client computing devices, input information indicating feature values entered and/or selected by the developers via the user interface fields; responsive to receipt of first input information, configure a first application in accordance with the feature values included in a first feature values set; provide the configured application for user by one or more users; and/or other exemplary implementations.

16 Claims, 5 Drawing Sheets

(56) References Cited

U.S. PATENT DOCUMENTS

2023/0385085 A1    11/2023    Singh
2023/0393870 A1    12/2023    Singh

OTHER PUBLICATIONS

Ouyang, Long, et al. "Training language models to follow instructions with human feedback." Advances in Neural Information Processing Systems 35 (2022): 27730-27744. (Year: 2022).

Pook, Stuart. "Interaction and Context in Zoomable User Interfaces." École Nationale Supérieure des Télécommunications. Paris, France (2001). (Year: 2001) 260 pages.

\* cited by examiner

SYSTEMS AND METHODS FOR PROVIDING A USER INTERFACE THAT FACILITATES APPLICATION DEVELOPMENT

FIELD OF THE DISCLOSURE

The present disclosure relates to systems and methods for providing a user interface that facilitates application development.

BACKGROUND

No-code application builders are known. Large language models for text summarization and text generation are known. Chatbots, virtual assistants, conversational AI, and other types of interactive language models are known.

SUMMARY

Application development can be an expensive and difficult feat. It requires developers to have a vast knowledge of development environments, languages, and numerous other factors to generate functional applications. These obstacles have become even greater with the advent of machine-learning and the use of machine-learning models to perform and optimize application functions. Machine-learning provides developers with a powerful tool but also add an additional layer of complexity to application development. The present disclosure describes solutions to simplify the development of applications with underlying machine-learning models through a no-code or minimal-code application development interface. The resulting applications utilize machine-learning models to perform application functions, and the machine-learning models provide a mechanism to customize outputs for each individual user of the application through a refining process.

One or more aspects of the present disclosure include a system for providing a user interface that facilitates application development. The application may utilize one or more underlying machine-learning models to perform applications functions. The system may include electronic storage, one or more hardware processors configured by machine-readable instructions, and/or other components. Executing the machine-readable instructions may cause the one or more hardware processors to facilitate providing a user interface that facilitates application development. The machine-readable instructions may include one or more computer program components. The one or more computer program components may include one or more of a user interface component, input component, application component, and/or other components.

The user interface component may be configured to effectuate presentation of an application development interface to developers through client computing platforms associated with the developers. The application development interface may facilitate application development through user customization of feature values of application features. The application development interface may include user interface fields configured to receive entry and/or selection by the developers of the feature values for the application features. The application features may include an underlying model feature and/or other features. The user interface fields may include an underlying model selection field configured to receive entry and/or selection of an underlying model feature value that specifies a particular machine-learning model. The particular machine-learning model may be entered and/or selected from among a set of potential machine-learning models to be implemented in performance of applications functions.

The input component may be configured to receive, from the client computing devices, input information and/or other information. The input information may indicate feature values entered and/or selected by the developers via the user interface fields. The input information may include first input information indicating the feature values of a first feature values set for a first application. The first feature values set may be received from a first client computing platform associated with a first developer. The first feature values set may include a first underlying model feature value and/or other feature values. The first underlying model feature value may specify a first machine-learning model to be implemented in performance of application functions of the first application.

The application component may be configured to, responsive to receipt of the first input information, configure a first application in accordance with the feature values included in the first feature values set. The first application may implement the first machine-learning model to perform one or more application functions in accordance with the first underlying model feature value included in the first feature values set.

The application component may be configured to provide the configured applications for use by one or more users. Providing the application may include publishing the applications on an application marketplace. The first application may be published on the application marketplace.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
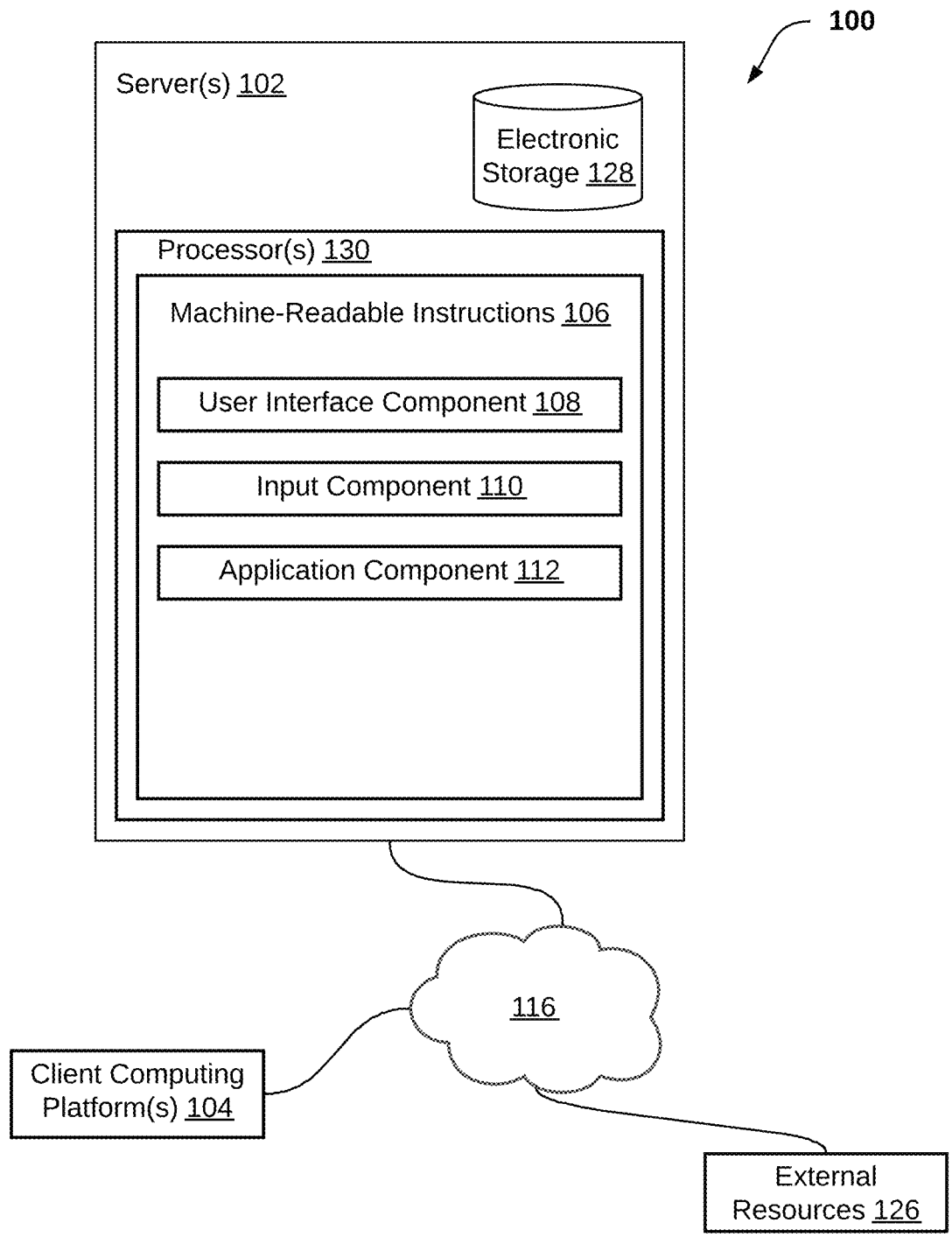
FIG. 1 illustrates a system for providing a user interface that facilitates application development, in accordance with one or more implementations.

FIG. 1 illustrates a system 100 configured for providing a user interface that facilitates application development, in accordance with one or more implementations. In some implementations, system 100 may include one or more server(s) 102, electronic storage 128, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Executing the machine-readable instructions 106 may cause server(s) 102 to facilitate providing a user interface that facilitates application development. Machine-readable instructions 106 may include one or more instruction components. The instruction components may include computer program components. The instruction components may include one or more of user interface component 108, input component 110, application component 112, and/or other instruction components.

Electronic storage 128 may store and/or maintain response records for individual users and/or other information. Individual response records for individual ones of the users may include responses by individual ones of the users to prompts and/or other information. By way of non-limiting illustration, the response records may include a first response record for a first user. The first response record may include responses provided by the first user to prompts. In some implementations, the first response record and/or the first user may be identifiable by a unique identifier (UID). The UID associated with the first user may facilitate identification of the first response record as corresponding with the first user. In some implementations, the unique identifier associated with the first user may facilitate identification and/or updates to the first response record responsive to detection of response(s) by the first user to one or more provided prompts. In some implementations, the UID associated with the first user may be generated responsive to creation of a user account by the first user. Creation of a user account by the first user may generate user account information for the first user. Electronic storage 128 may store user account information associated individual ones of the users. User account information associated with an individual user may include a UID associated with the individual user and/or a response record for the individual user. In some implementations, user account information may include identification information (e.g., name, birthday, email address, etc.), demographic information (e.g., age, race, gender, income, education, employment, etc.), and/or other information.

Responses included in the first response record may include text, image, audio, video, sensor data, and/or other types of content. The content included in the stored responses may include content selected and/or entered by the first user in response to one or more provided prompts. By way of non-limiting illustration, a prompt provided to the first user via a client computing platform 104 associated with the first user may be a question (e.g., "Which interior design style do you prefer?"), statement (e.g., "Choose your preferred interior design style."), and/or other type of prompt. A user interface of the client computing platform 102 may display one or more images and/or other content corresponding to the provided prompt (e.g., two or more images depicting different interior design styles), and/or other user interface elements. In some implementations, the one or more images and/or other content may be displayed simultaneously with the prompt. A response by the first user to the prompt may include selection of an image. The selected image may be stored in the first response record. In some implementations, the selected image may be stored in conjunction with the prompt. Responses within individual response records may be stored in an unstructured format, semi-structured format, and/or other data formats. By way of non-limiting illustration, a response record having an unstructured format may store responses in one or more files without an organizational schema. A response record having a semi-structured format may store responses in a tree-like structure, graph structure, and/or other data structures. In some implementations, response records and/or responses for individual ones of the users may be obtained (e.g., from external resource(s) 126 via network(s) 116) and/or imported (e.g., uploaded) by the individual users (e.g., via client computing platform(s) 104).

User interface component 108 may be configured to effectuate presentation of an application development interface to developers through client computing platforms (e.g., client computing platform(s) 104) associated with the developers. The application development interface may facilitate application development through user customization of feature values of application features. The application development interface may include one or more user interface fields configured to receive entry and/or selection by the developers of the feature values for the application features. Individual ones of the user interface fields may correspond to individual ones of the application features. An individual user interface field corresponding to an individual application feature may be configured to receive entry and/or selection of one or more feature values for the individual application feature.

The individual user interface field may present one or more potential feature values for the individual feature. The individual user interface field may include one or more lists, dropdown menus, and/or other types of user interface elements. The list and/or dropdown menu may be presented responsive to user input indicating interaction with the individual user interface field. In some implementations, the list and/or dropdown menu may be shown responsive to user input. The user input may indicate a developer hovering a cursor over the individual user interface field, clicking on the individual user interface field, and/or other types of interaction with the application development interface. The list (and/or dropdown menu) may include individual list items corresponding to individual potential feature values. The list items may include icons and/or labels that represent the corresponding potential feature values. Developers may select one or more potential feature values for the individual feature (e.g., clicking the list item corresponding with the desired potential feature value). In some implementations, the individual user interface field may include one or more sliders, toggles, check boxes, buttons, pickers, steppers, and/or other user interface elements for selecting feature values for individual features. By way of non-limiting illustration, an individual user interface field corresponding to an individual application feature may include a slider. Developers may select an individual feature value for the individual application feature by dragging a point along the slider to the desired position. Different positions along the slider may correspond with one or more potential feature values for the individual application feature.

In some implementations, the application development interface may include a progress bar and/or other user interface elements. The progress bar may include one or more segments corresponding to individual application features. The progress bar may indicate individual application features for which feature values have and/or have not been entered and/or selected by the developer. Individual segments of the progress bar may change responsive to entry and/or selection, by the developer, of one or more feature values for the corresponding application features. Changes to the segments may include changes to the color, shape, and/or other characteristics of the segments. In some implementations, the application development interface may indicate one or more individual application features for which entry and/or selection of features values is required. The user interface fields associated with the one or more individual application features may include an asterisk and/or other icons to indicate that entry and/or selection of a feature value is required. In some implementations, absent an entry and/or selection of a feature value for an application feature by the developer, a default feature value for the application feature may be selected by system 100.

The application features may include an underlying model feature and/or other features. The user interface fields may include an underlying model selection field configured to receive entry and/or selection of an underlying model feature value that specifies a particular machine-learning model. The underlying model selection field may include a list of potential machine-learning models. Individual list items may represent and/or correspond with individual potential machine-learning models. The one or more potential models may be publicly available models (e.g., GPT-3, GPT-3.5, GPT-4, Claude-v1, Claude-v2, Claude Instant, etc.), private models, and/or other types of models. Publicly available models may be obtained from external resources 126 via network(s) 116 and/or other sources. The one or more potential machine-learning models may include predictive models, neural networks, Bayesian networks, expert systems, decision tress, collections of decisions tress, support vector machines, and/or other types of models and/or systems. The particular machine-learning model may be entered and/or selected from among the one or more potential machine-learning models to be implemented in performance of applications functions. Application functions may include summarizing, translating, predicting, and/or otherwise generating content based on user input.

In some implementations, the application features may include one or more subordinate application features. Subordinate application features may be subordinate to (e.g., depend on, be related to, and/or otherwise associated with) one or more other application features. By way of non-limiting illustration, the application features may include a model input size feature, a model output size feature, model output format feature, model temperature feature, and/or other application features. The model input size feature, model output size feature, and/or the model output format feature may be subordinate to the underlying model feature. Feature values of the model input size feature may describe and/or limit the size of inputs provided as input to the particular machine-learning model selected as the feature value for the underlying model feature. Feature values of the model output size feature may describe and/or limit the size of outputs generated by the particular machine-learning model selected as the feature value for the underlying model feature. Feature values of the model output format feature may describe an arrangement, style, and/or other characteristics of outputs generated by the particular machine-learning model selected as the feature value for the underlying model feature. Feature values for the model temperature feature may specify a level of randomness for outputs generated by the particular machine-learning model selected as the feature value for the underlying model feature. In some implementations, the developer may select one or more potential machine-learning models for the underlying model feature. The application features may include a model configuration feature that is subordinate to the underlying model feature. By way of non-limiting illustration, feature values of the model configuration feature may indicate an order for the one or more machine-learning models specified by the feature values of the underlying model feature. For example, the feature values of the underlying model feature may specify a first machine-learning model, a second machine-learning model, and/or other potential machine-learning models. The feature values of the model configuration feature may indicate the first machine-learning model is followed by the second machine-learning model. The order of the first machine-learning model followed by the second machine-learning model may indicate outputs generated by the first machine-learning model are provided as inputs to the second machine-learning model. Such configuration of the first machine-learning model, the second machine-learning model, and/or other machine-learning models may be implemented to perform application functions. In some implementations, the application features may include one or more model instruction features. The model instruction features may be subordinate to the underlying model feature. Feature values for the model instruction feature may include instructions for the particular machine-learning model selected as the feature value for the underlying model feature. Instructions may be provided to the particular machine-learning model and/or may be specify tasks to be performed by the model. Tasks may include summarizing, translating, predicting, and/or otherwise generating content based on user input.

In some implementation ns, the application features may include a supplemental prompts feature. One or more supplemental prompts specified by the feature values of the supplemental prompts feature may be presented to individual users of the applications. Individual supplemental prompts may be a question, statement, interactive activity, and/or other type of prompt. The individual users may provide user input indicating responses to the one or more supplemental prompts. The underlying models of the individual applications may be refined based on responses, by individual ones of the users of the applications, to the one or more supplemental prompts specified by the feature values of the supplemental prompts feature. In some implementations, the user interface fields may include a supplemental prompts field for entering and/or selecting one or more values of features values specifying supplemental prompts. In some implementations, the supplemental prompts field may include one or more selectable user interface elements representing and/or corresponding with individual supplemental prompts. By way of non-limiting illustration, the supplemental prompts field may include a list of one or more list items. Individual ones of the one or more list items may correspond with individual supplemental prompts. In some implementations, the supplemental prompts field may facilitate user entry of supplemental prompts. By way of non-limiting illustration, the supplemental prompts field may be a text input field that enables developers to type and/or otherwise submit customized supplemental prompts.

In some implementations, the application features may include a prompt responses feature that is subordinate to the supplemental prompts feature. One or more feature values of the prompt responses feature may specify one or more response options for the supplemental prompt specified by the feature value of the supplemental prompts feature. The user interface fields may include a prompt responses field that enables developers to enter and/or select response options for corresponding individual supplemental prompt(s). The one or more response options may be presented to users of the application with the corresponding supplemental prompt(s). In some implementations, the application features may include multiple supplemental prompt features and/or response option features. By way of non-limiting illustration, the application features may include a first supplemental prompt feature, a second supplemental prompt feature, and/or other application features. A first supplemental prompt selection field may be configured to receive entry and/or selection of a first supplemental prompt feature value that specifies a first supplemental prompt. A second supplemental prompt selection field may be configured to receive entry and/or selection of a second supplemental prompt feature value that specifies a second supplemental prompt. The application features may include a first response option feature, a second response option feature, and/or other application features. The first response option feature may be subordinate to the first supplemental prompt feature, the second response option feature may be subordinate to the second supplemental prompt feature, and so on and so forth. A first response option selection field may be configured to receive entry and/or selection of one or more feature values that specify one or more response options for the first supplemental prompt. A second response option selection field may be configured to receive entry and/or selection of one or more feature values that specify one or more response option for the second supplemental prompt. In some implementations, responsive to accessing and/or initiating the application, the first supplemental prompt and/or the one or more response options for the first supplemental prompt may be presented to a user. The second supplemental prompt and/or the one or more response options for the second supplemental prompt may be presented to the user responsive to user input indicating a response to the first supplemental prompt.

In some implementations, the application features may include one or more information request features. A feature value for an individual information request feature may indicate a type of information requested from users of the application, a prompt to present to users of the application, and/or other information. Types of information requested from users of the application may include links (e.g., to third-party websites), documents, images, videos, and/or other types of content. In some implementations, users may provide the requested information by uploading, importing, and/or other inputting the requested information. Information provided by the user of the application may be used by the one or more underlying models indicated by the feature value(s) for the underlying model feature. In some implementations, the information provided by the user of the application may be provided as input to the under lying model and/or may be used to refine (e.g., train) the underlying model.

In some implementations, the application features may include an application name feature, an application description feature, a share settings feature, an application preview feature, and/or other features. A feature value for the application name feature may be used to identify and/or represent the application within the application marketplace. A feature value for the application description feature may include a description of the functions and/or purpose of the application. The application description may be shown in conjunction with the application name within the application marketplace. A feature value for the share settings feature may identify who may access the application. By way of non-limiting illustration, a feature value for the share settings feature may indicate the application is only accessible through a direct link (e.g., only users having access to the link may access and/or use the application. A feature values for the application preview feature may include pictures, videos, and/or other types of content. The pictures, videos and/or other types of content may be shown to prospective users of the application and/or shown within the application marketplace.

Input component 110 may be configured to receive, from the client computing devices, input information and/or other information. The input information may indicate feature values entered and/or selected by the developers via the user interface fields. The feature values may be entered and/or selected by the developers via user interaction with the one or more user interface fields for individual ones of the application features. The input information may include first input information indicating the feature values of a first feature values set for a first application. The first feature values set may be received from a first client computing platform associated with a first developer. The first feature values set may include a first underlying model feature value and/or other feature values. In some implementations, the first feature values set may include one or more default value features for one or more application features. The one or more default value features may be included in the first feature values set for a first application responsive to the first developer not entering and/or selecting feature values for the one or more application features.

The first underlying model feature value may specify a first machine-learning model to be implemented to perform one or more application functions of the first application. The first machine-learning model may be configured to receive input from one or more users of the first application. The first machine-learning model may be configured to generate outputs based on the received user input. Outputs from the first machine-learning model may be provided to the one or more users of the first application. In some implementations, the functionality of the first application may be determined by the feature value of the underlying model feature. By way of non-limiting illustration, the application functions of the first application performed by the first machine-learning model may be different from the application functions of the first application performed by a second machine-learning model.

Application component 112 may be configured to, responsive to receipt of the first input information, configure a first application in accordance with the feature values included in the first feature values set. Configuring the first application may include generating, aggregating, and/or constructing a first application package for the first application based on the first feature values set. The first application package may include machine-readable instructions that facilitates implementation of the first machine-learning model to perform one or more functions of the first application. The first application may implement the first machine-learning model to perform one or more application functions in accordance with the first underlying model feature value included in the first feature values set. In some implementations, configuring the first application may include generating an executable file containing machine-readable instructions to initiate and/or run the first application. Machine-readable instructions included in the executable file for the first application may generated in accordance with the first underlying model feature value included in the first feature values set (i.e., the first machine-learning model).

Application component 112 may be configured to provide the configured applications for use by one or more users. Providing the application may include publishing, sharing, and/or otherwise distributing the applications for use by one or more users. In some implementations, the application may be published within an application marketplace. The application marketplace may facilitate use of individual applications by individual users. By way of non-limiting illustration, the first application may be published on the application marketplace. Individual users may access the application marketplace via one or more client computing platform(s) 104. Publishing the first application on the application marketplace may include adding the first application to a set of applications available for use within the application marketplace. Publishing the first application may enable users with access to the application marketplace to access and/or use the first application. In some implementations, users may access the application marketplace through a browser-based interface (e.g., on client computing platform(s) 104 via networks 116). In some implementations, the browser-based interface may be a mobile browser-based interface accessible via a mobile computing device. The browser-based interface may provide access to and/or facilitate use of the applications published within the application marketplace. In some implementations, users having access to the application marketplace may download individual instances (e.g., local copies) of individual applications. The instances of individual applications may facilitate use of the application on client computing platform(s) 104 associated with the individual users. In some implementations, the first application may be configured and/or published responsive to receipt of user input from the developer (i.e., via the application development interface) indicating a request to publish. In some implementations, providing he configured application may include publishing the application within a third-party application. The configured application may be embedded within and/or accessible from the third-party application.

In some implementations, the application development interface may include one or more user interface fields configured to receive selection by the developers of application templates. The application templates may be associated with sets of pre-determined feature values for the application features. The application templates may include a first application template associated with a first pre-determined feature values set. Input component 110 may be configured to receive, from the client computing device(s), input information indicating application templates selected by the developers via the one or more user interface fields. By way of non-limiting illustration, the input information may include second input information indicating the first application template and/or other information. The first pre-determined feature values set associated with the first application template may be received from the first client computing platform associated with the first developer. Application component 112 may be configured to, responsive to receipt of the second input information, configure a second application in accordance with the feature values in the first pre-determined feature values set associated with the first application template. Application component 112 may be configured to provide the second application for use by one or more users.

In some implementations, refining the first machine-learning model may include training the first machine-learning model on training information. The training information may include the response record for individual ones of the users. In some implementations, refining the first machine-learning model may include training the first machine-learning model on training information and/or other information. The training information may include the responses by an individual user to the supplemental prompts, a response record for the individual user, and/or other information. In some implementations, the machine-learning model may utilize one or more of an artificial neural network, naïve bayes classifier algorithm, k means clustering algorithm, support vector machine algorithm, linear regression, logistic regression, decision trees, random forest, nearest neighbors, and/or other approaches. Application component 112 may utilize training techniques such as supervised learning, semi-supervised learning, unsupervised learning, reinforcement learning, and/or other techniques.

In supervised learning, the model may be provided with known training dataset that includes desired inputs and outputs (e.g., the input/output pairs described herein), and the model may be configured to find a method to determine how to arrive at those outputs based on the inputs. The model may identify patterns in data, learn from observations, and make predictions. The model may make predictions and may be corrected by an operator—this process may continue until the model achieves a high level of accuracy/performance. Supervised learning may utilize approaches including one or more of classification, regression, and/or forecasting.

Semi-supervised learning may be similar to supervised learning, but instead uses both labelled and unlabeled data. Labelled data may comprise information that has meaningful tags so that the model can understand the data (e.g., the input/output pairs described herein), while unlabeled data may lack that information. By using this combination, the machine-learning model may learn to label unlabeled data.

For unsupervised learning, the machine-learning model may study data to identify patterns. There may be no answer key or human operator to provide instruction. Instead, the model may determine the correlations and relationships by analyzing available data. In an unsupervised learning process, the machine-learning model may be left to interpret large data sets and address that data accordingly. The model tries to organize that data in some way to describe its structure. This might mean grouping the data into clusters or arranging it in a way that looks more organized. Unsupervised learning may use techniques such as clustering and/or dimension reduction.

Reinforcement learning may focus on regimented learning processes, where the machine-learning model may be provided with a set of actions, parameters, and/or end values. By defining the rules, the machine-learning model then tries to explore different options and possibilities, monitoring and evaluating each result to determine which one is optimal to generate correspondences. Reinforcement learning teaches the model trial and error. The model may learn from past experiences and adapt its approach in response to the situation to achieve the best possible result.

In some implementations, refining the first machine-learning model may include modifying a context window corresponding to the first machine-learning model. Modifying the content window may include modifying the size of inputs capable of being processed by the first machine-learning model. In some implementations, refining the first machine-learning model may include modifying and/or filtering one or more outputs generated by the first machine-learning model. By way of non-limiting illustration, application component 112 may be configured to generate and/or a modify an output layer of the first machine-learning model based on response(s) by an individual user to the supplemental prompts, the response record for the individual user, and/or other information. In some implementations, outputs generated by the first machine-learning model may be provided to users of the first application as application output.

Figure 3A:
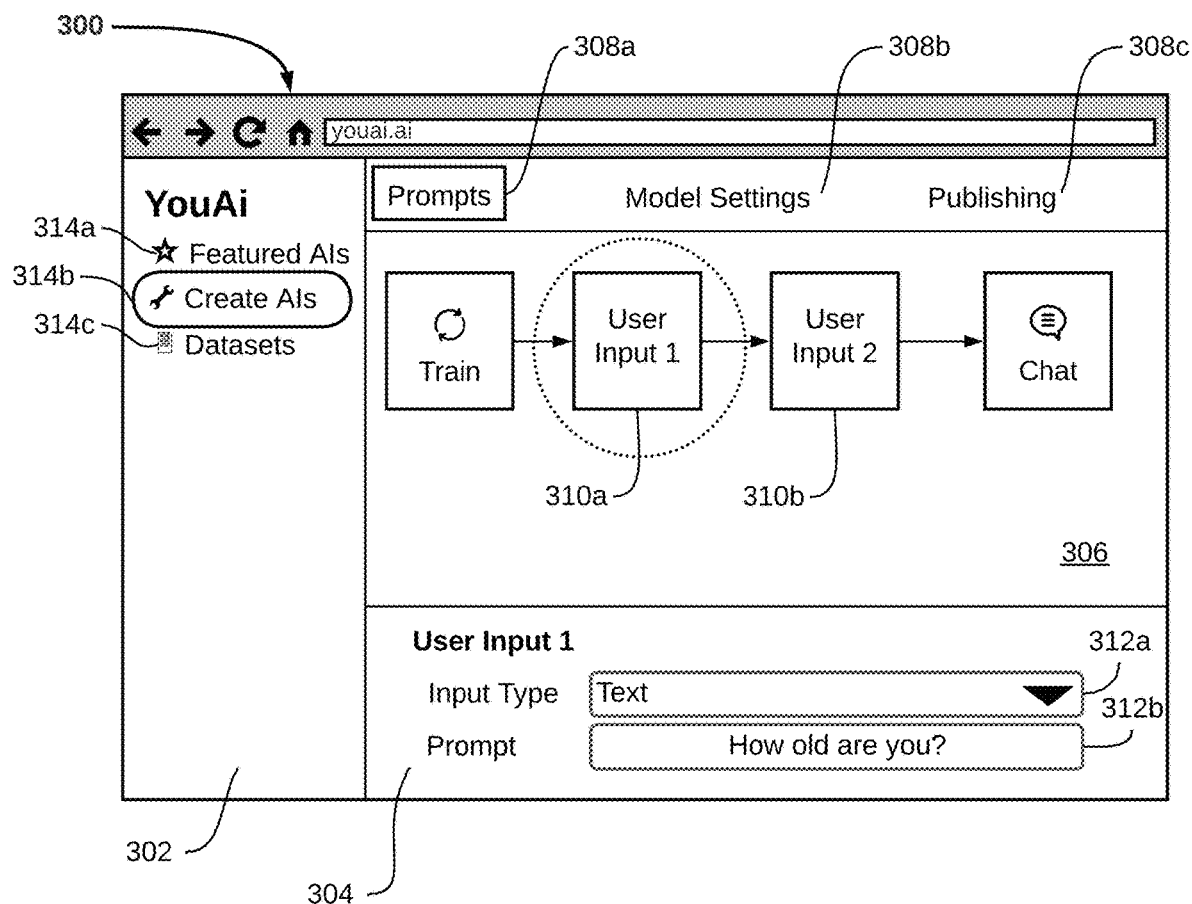
FIGS. 3A-C illustrates a user interface, in accordance with one or more implementations.
Figure 3B:
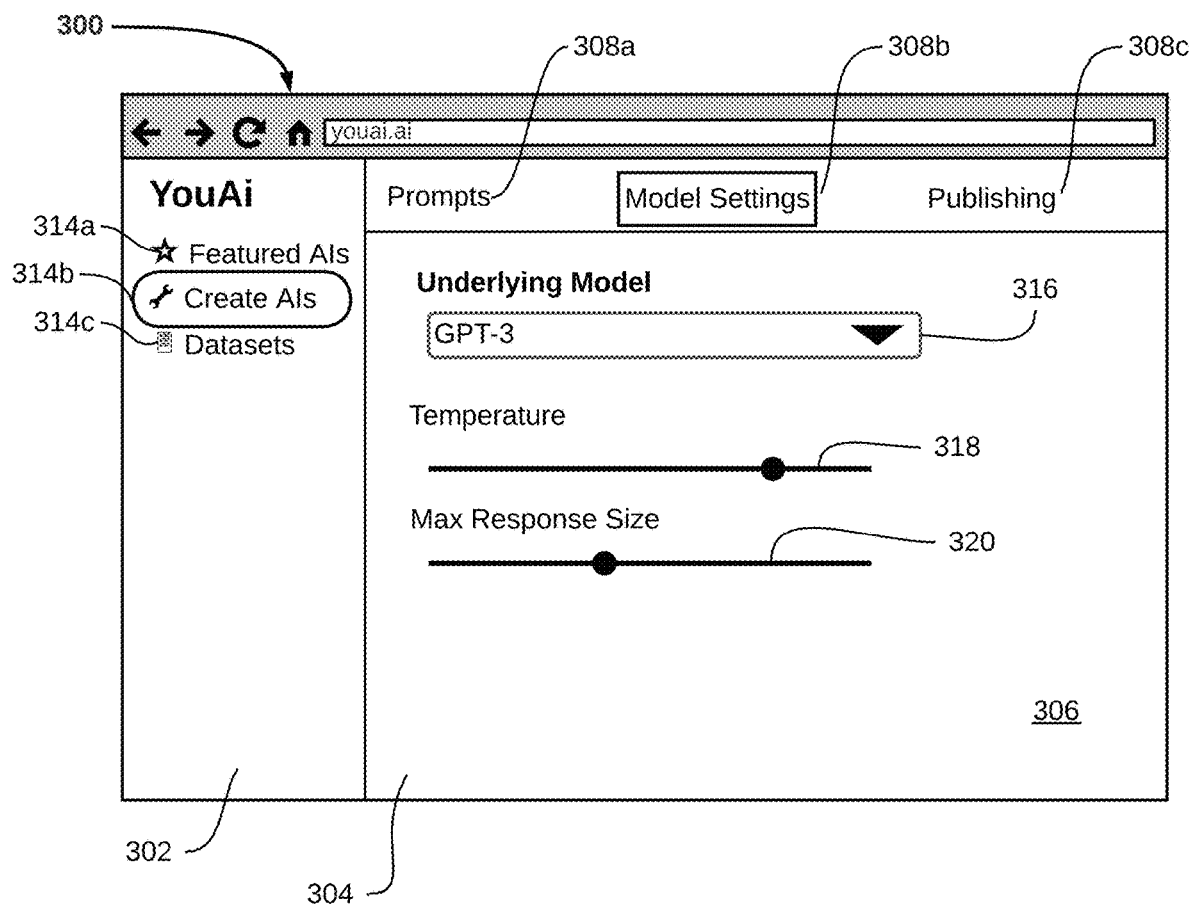
Figure 3C:
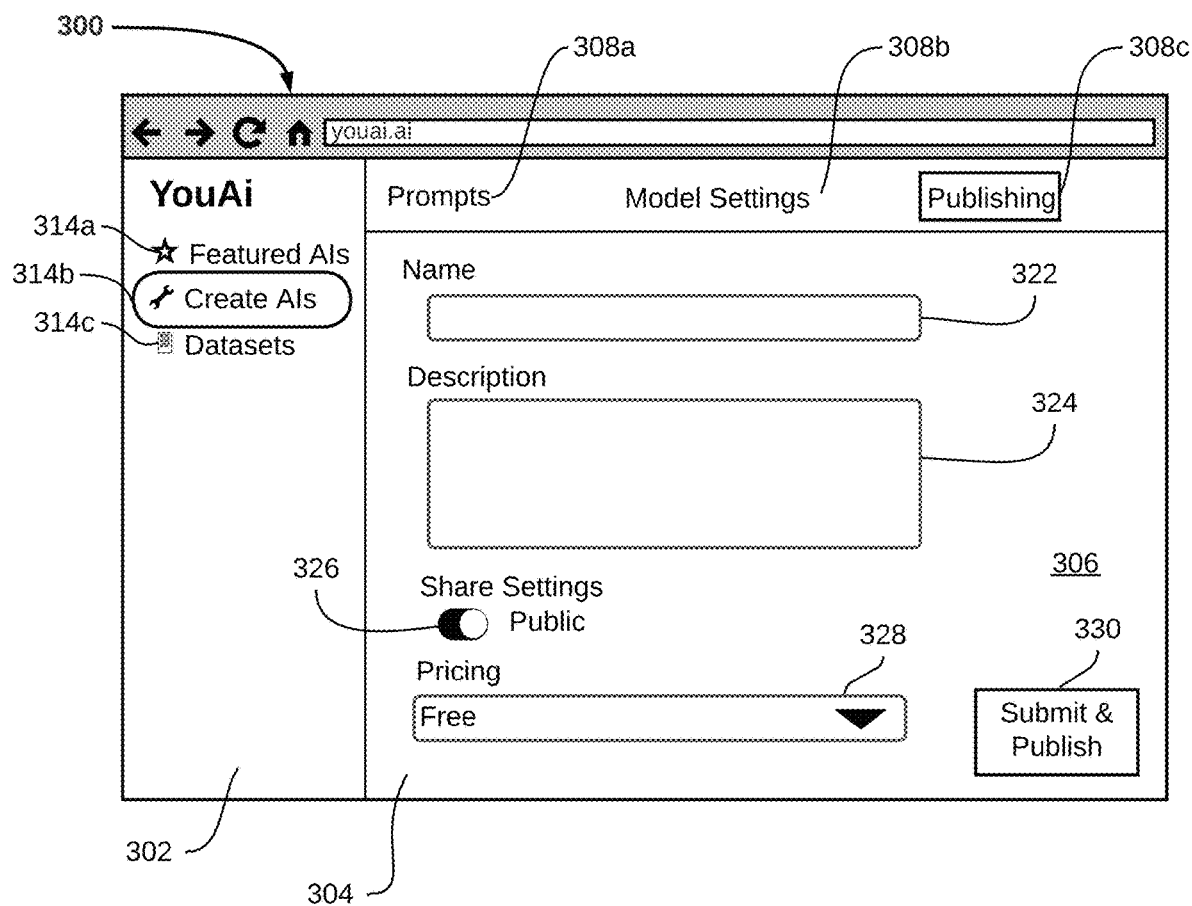

FIGS. 3A-C illustrates a user interface 300 that may be used by a system to provide a user interface that facilitates application development of applications utilizing one or more underlying machine-learning models to perform application functions. User interface 300 may include a first portion 302, a second portion 304, and/or other portions. First portion 302 may include one or more navigational buttons 314a-c and/or other user interface elements. User selection of a second navigational button 314b may facilitate presentation of an application development interface 306 within the second portion 304 of the user interface 300. Application development interface 306 may include a first set of feature buttons 308a-c and/or other user interface elements. FIG. 3A illustrates the application development interface 306 responsive to developer selection of a first feature button 308a. The first feature button 308a may represent and/or be associated with one or more supplemental prompt features. By way of non-limiting illustration, application features may include a first supplemental prompt feature, a second supplemental prompt feature, and/or other application features. Application interface 306 may include a first supplemental prompt selection button 310a, a second supplemental prompt selection button 310b, and/or other user interface elements. The first supplemental prompt selection button 310a may be associated with the first supplemental prompt feature value and the second supplemental prompt selection button 310b may be associated with the second supplemental prompt feature value. Developer selection of the first supplemental prompt selection button 310a may facilitate presentation of one or more supplemental prompt selection fields 312a-b. The supplemental prompt selection fields 312a-b may facilitate selection (by the developer) of one or more feature values for the first supplemental prompt feature.

FIG. 3B illustrates application development interface 306 responsive to developer selection of a second feature button 308b. The second feature button 308b may represent and/or be associated with an underlying model feature. Application development interface 306 may include an underlying model selection field 316 that facilitates entry and/or selection of a machine-learning model for the feature value of the underlying model feature. Underlying model selection field 316 is shown as a drop-down menu, however this is not intended to be limiting. In other implementations, underlying model selection field 316 may facilitate developers importing and/or uploading one or more machine-learning models for the feature value for the underlying model feature. Application development interface 306 may include a model temperature selection field 318, a max response selection field 320, and/or other selection fields. Model temperature selection field 318 may facilitate selection of a feature value for a model temperature feature. The model temperature feature may describe the randomness of outputs generated by the model specified by the feature value for the underlying model feature. The model temperature feature may be subordinate to the underlying model feature. Max response selection field 318 may facilitate selection of a feature value for a max response feature. The max response feature may describe the maximum size of outputs generated by the model specified by the feature value for the underlying model feature. The max response feature may be subordinate to the underlying model feature. Model temperature selection field 318 and max response selection field 320 are shown as sliders however this is not intended to be limiting. Other types of user interface elements are imagined for the selection fields for entry and/or selection of feature values for application features.

FIG. 3C illustrates application development interface 306 responsive to developer selection of a third feature button 308c. Application development interface 306 may include an application name field 322, an application description field 324, a share settings toggle 326, a pricing selection field 328, and/or other user interface elements. Application name field 322 may facilitate entry and/or selection of an application name by developers. The application name entered and/or selected via application name field 322 may be displayed within the application marketplace in association with the configured application. Application description field 324 may facilitate entry and/or selection of an application description by developers. The application description entered and/or selected vis application description field 324 may be displayed within the application marketplace in association with the configured application. Share settings toggle 326 may facilitate selection of share settings that determine accessibility of the configured application by one or more users. Pricing selection field 328 may facilitate entry and/or selection of an amount of consideration required to access and/or use the configured application (e.g., from the application marketplace). Application development interface 306 may include a submit button 330. User input indicating developer selection of the submit button 330 may facilitate configuring and/or publish an application in accordance with selected feature values for application features.

In some implementations, server(s) 102, client computing platform(s) 104, and/or external resources 126 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user corresponding to the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a Smartphone, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, of 30 and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, and/or 112, and/or other components. Processor(s) 130 may be configured to execute components 108, 110, and/or 112, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 1 as being implemented within a single processing unit, in implementations in which processor(s) 130 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 130 may be configured to execute one or more additional components that may perform some or all of the functionality attributed below to one of components 108, 110, and/or 12.

Figure 2:
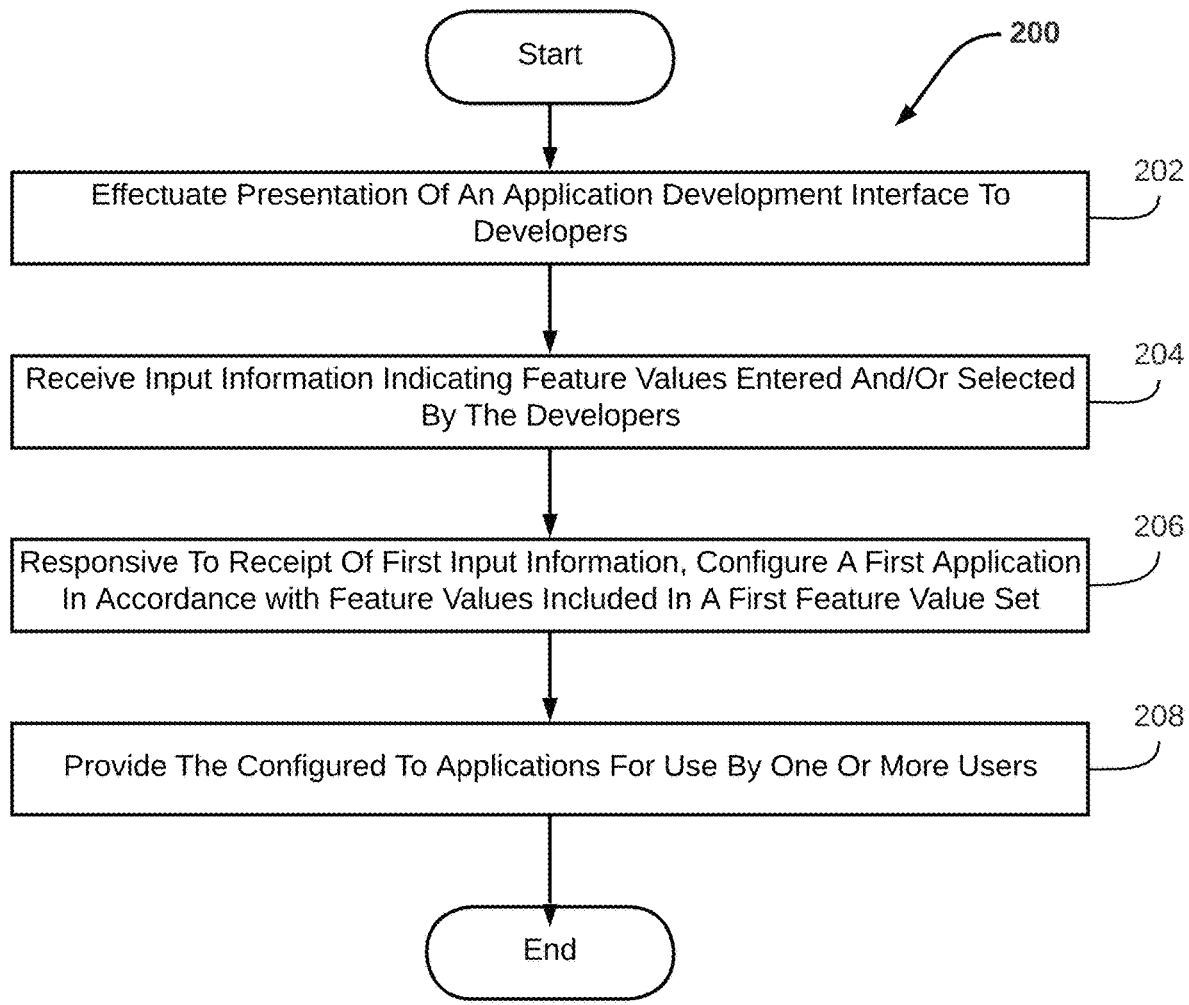
FIG. 2 illustrates a method for providing a user interface that facilitates application development, in accordance with one or more implementations.

FIG. 2 illustrates a method 200 for providing a user interface that facilitates application development, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include effectuating presentation of an application development interface to developers through client computing platforms associated with the developers. The application development interface may facilitate application development through user customization of feature values of application features. The application development interface may include user interface fields configured to receive entry and/or selection by the developers of the feature values for the application features. The application features may include an underlying model feature and/or other features. The user interface fields may include an underlying model selection field configured to receive entry and/or selection of an underlying model feature value that specifies a particular machine-learning model. The particular machine-learning model may be entered and/or selected from among a set of potential machine-learning models to be implemented in performance of applications functions. Operation 202 may be performed by one or more components that is the same as or similar to user interface component 108, in accordance with one or more implementations.

An operation 204 may include receiving, from the client computing devices, input information and/or other information. The input information may indicate feature values entered and/or selected by the developers via the user interface fields. The input information may include first input information indicating the feature values of a first feature values set for a first application. The first feature values set may be received from a first client computing platform associated with a first developer. The first feature values set may include a first underlying model feature value and/or other feature values. The first underlying model feature value may specify a first machine-learning model to be implemented in performance of application functions of the first application. Operation 204 may be performed by one or more hardware processors configured by machine-readable instructions including a component that is the same as or similar to input component 110, in accordance with one or more implementations.

An operation 206 may include, responsive to receipt of the first input information, configuring a first application in accordance with the feature values included in the first feature values set. The first application may implement the first machine-learning model to perform one or more application functions in accordance with the first underlying model feature value included in the first feature values set. Operation 206 may be performed by one or more hardware processors configured by machine-readable instructions including a component that is the same as or similar to application component 112, in accordance with one or more implementations.

An operation 208 may include providing the configured applications for use by one or more users. Providing the application may include publishing the applications on an application marketplace. The first application may be published on the application marketplace. Operation 208 may be performed by one or more hardware processors configured by machine-readable instructions including a component that is the same as or similar to application component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A system configured to provide a user interface that facilitates application development of applications that utilize one or more underlying machine-learning models to perform application functions, the system comprising:
   one or more physical processors configured by machine-readable instructions to:
      effectuate presentation of an application development interface to developers through client computing platforms associated with the developers, wherein the application development interface facilitates the application development through user customization of feature values of application features, wherein the application development interface includes user interface fields configured to receive entry and/or selection by the developers of the feature values for the application features, wherein the application features include an underlying model feature, and wherein the user interface fields include an underlying model selection field configured to receive the entry and/or the selection of an underlying model feature value that specifies a particular machine-learning model, from among a set of potential machine-learning models, to be implemented in performance of the applications functions;
      receive, from the client computing devices, input information indicating the feature values entered and/or selected by the developers via the user interface fields, wherein the input information includes first input information indicating the feature values of a first feature values set for a first application, wherein the first feature values set is received from a first client computing platform associated with a first developer, wherein the first feature values set includes a first underlying model feature value that specifies a first machine-learning model to be implemented in performance of application functions of the first application, wherein the first machine-learning model is capable of being refined based on response records for individual users to individualize outputs generated by the first machine-learning model for individual ones of the users, wherein refining the first machine-learning model includes training the first machine-learning model on training information, and wherein the training information includes the response records for individual ones of the users;
      responsive to the receipt of the first input information, configure a first application in accordance with the feature values included in the first feature values set, such that the first application implements the first machine-learning model to perform one or more applications functions in accordance with the first underlying model feature value included in the first feature values set; and
      provide the first configured application for use by one or more users, wherein providing the first configured application includes publishing the first configured application on an application marketplace, such that the first configured application is published on the application marketplace.

2. The system of claim 1, wherein individual machine-learning models of the set of potential machine-learning models are publicly available models or private models.

3. The system of claim 1, wherein the application development interface includes the user interface fields configured to receive selection by the developers of application templates associated with sets of pre-determined feature values for the application features, such that the application templates include a first application template associated with a first pre-determined feature values set.

4. The system of claim 3, wherein the one or more physical processors are further configured by the machine-readable instructions to:
   receive, from the client computing devices, input information indicating the application templates selected by the developers via the user interface fields, wherein the input information includes second input information indicating the first application template, wherein the first pre-determined feature values set associated with the first application template is received from the first client computing platform associated with the first developer;
   responsive to the receipt of the second input information, configure a second application in accordance with the feature values in the first pre-determined feature values set associated with the first application template;
   provide the second application for use by one or more user.

5. The system of claim 1, wherein the system further comprises:
   electronic storage that stores the response records for individual users, wherein the response records for individual ones of the users includes responses by the individual ones of the users to prompts, wherein the prompts are provided through client computing platforms associated with individual ones of the users.

6. The system of claim 1, wherein the application features include a supplemental prompts feature, wherein one or more supplemental prompts associated with an individual application are presented to individual users of the individual application, and wherein an underlying model of the individual application is refined based on responses, by individual ones of the users, to the one or more supplemental prompts associated with the individual application.

7. The system of claim 6, wherein the application development interface includes one or more fields for entering and/or selecting the one or more supplemental prompts, wherein the one or more entered and/or selected supplemental prompts are feature values of a second application feature.

8. The system of claim 1, wherein the application features include a temperature feature and/or an output size feature, wherein the user interface fields include a temperature feature selection field configured to receive entry and/or selection of a temperature feature value that specifies a level of randomness for outputs generated by the application, and wherein the user interface fields include an output size feature selection field configured to receive entry and/or selection of an output size value that specifies a maximum size of outputs generated by the application.

9. A method for providing a user interface that facilitates application development of applications that utilize one or more underlying machine-learning models to perform application functions, the method comprising:

effectuating presentation of an application development interface to developers through client computing platforms associated with the developers, wherein the application development interface facilitates the application development through user customization of feature values of application features, wherein the application development interface includes user interface fields configured to receive the entry and/or the selection by the developers of the feature values for the application features, wherein the application features include an underlying model feature, and wherein the user interface fields include an underlying model selection field configured to receive entry and/or selection of an underlying model feature value that specifies a particular machine-learning model, from among a set of potential machine-learning models, to be implemented in performance of the applications functions;

receiving, from the client computing devices, input information indicating the feature values entered and/or selected by the developers via the user interface fields, wherein the input information includes first input information indicating the feature values of a first feature values set for a first application, wherein the first feature values set is received from a first client computing platform associated with a first developer, wherein the first feature values set includes a first underlying model feature value that specifies a first machine-learning model to be implemented in performance of application functions of the first application, wherein the first machine-learning model is capable of being refined based on response records for individual users to individualize outputs generated by the first machine-learning model for individual ones of the users, wherein refining the first machine-learning model includes training the first machine-learning model on training information, and wherein the training information includes the response records for individual ones of the users;

responsive to the receipt of the first input information, configuring a first application in accordance with the feature values included in the first feature values set, such that the first application implements the first machine-learning model to perform one or more applications functions in accordance with the first underlying model feature value included in the first feature values set; and providing the configured applications for use by one or more users, wherein providing the applications includes publishing the applications on an application marketplace, such that the first application is published on the application marketplace.

10. The method of claim 9, wherein individual machine-learning models of the set of potential machine-learning models are publicly available models or private models.

11. The method of claim 9, wherein the application development interface includes the user interface fields configured to receive selection by the developers of application templates associated with sets of pre-determined feature values for the application features, such that the application templates include a first application template associated with a first pre-determined feature values set.

12. The method of claim 11, wherein the method further comprises:

receiving, from the client computing devices, input information indicating the application templates selected by the developers via the user interface fields, wherein the input information includes second input information indicating the first application template, wherein the first pre-determined feature values set associated with the first application template is received from the first client computing platform associated with the first developer;

responsive to the receipt of the second input information, configuring a second application in accordance with the feature values in the first pre-determined feature values set associated with the first application template;

providing the second application for use by one or more user.

13. The method of claim 9, wherein the method further comprises:

storing the response records for individual users, wherein response records for individual ones of the users includes responses by the individual ones of the users to prompts, wherein the prompts are provided through client computing platforms associated with individual ones of the users.

14. The method of claim 9, wherein the application features include a supplemental prompts feature, wherein one or more supplemental prompts associated with an individual application are presented to individual users of the individual application, and wherein an underlying model of the individual application is refined based on responses, by individual ones of the users, to the one or more supplemental prompts associated with the individual application.

15. The method of claim 14, wherein the application development interface includes one or more fields for entering and/or selecting the one or more supplemental prompts, wherein the one or more entered and/or selected supplemental prompts are feature values of a second application feature.

16. The method of claim 9, wherein the application features include a temperature feature and an output size feature, wherein the user interface fields include a temperature feature selection field configured to receive entry and/or selection of a temperature feature value that specifies a level of randomness for outputs generated by the application, and wherein the user interface fields include an output size feature selection field configured to receive entry and/or selection of an output size value that specifies a maximum size of outputs generated by the application.

* * * * *